(12) United States Patent
Smith

(10) Patent No.: US 6,863,424 B2
(45) Date of Patent: Mar. 8, 2005

(54) LIGHT BAR WITH INTEGRATED WARNING ILLUMINATION AND LENS SUPPORT STRUCTURE

(75) Inventor: Kevin M. Smith, Chester, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 10/636,886

(22) Filed: Aug. 7, 2003

(65) Prior Publication Data

US 2004/0109313 A1 Jun. 10, 2004

Related U.S. Application Data

(60) Provisional application No. 60/401,551, filed on Aug. 7, 2002.

(51) Int. Cl.[7] ............................................. F21V 17/00
(52) U.S. Cl. ...................... 362/455; 362/244; 362/224; 362/267; 362/542; 340/472; 340/473
(58) Field of Search ................................ 362/368, 455, 362/244, 224, 267, 542, 493, 544, 546, 222, 237, 240, 243, 245, 329; 340/472, 473

(56) References Cited

U.S. PATENT DOCUMENTS

| 4,543,622 | A | 9/1985 | Menke et al. ............... 362/219 |
|---|---|---|---|
| 4,577,178 | A | 3/1986 | Hitora ....................... 340/81 R |
| 4,588,118 | A | 5/1986 | Ferenc et al. ................ 224/331 |
| 4,595,904 | A | 6/1986 | Gosswiller et al. ........... 340/87 |
| 4,620,268 | A | 10/1986 | Ferenc ......................... 362/74 |
| 4,626,966 | A | 12/1986 | Bleiwas et al. ................ 362/35 |
| 5,027,260 | A | 6/1991 | Lyons et al. .................. 362/74 |
| 5,091,828 | A | 2/1992 | Jincks et al. .................. 362/35 |
| 5,826,965 | A | 10/1998 | Lyons .......................... 362/74 |
| 5,884,997 | A | 3/1999 | Stanuch et al. ............. 362/493 |
| 6,140,918 | A | 10/2000 | Green et al. ................ 340/468 |
| 6,682,210 | B1 | 1/2004 | Ford et al. .................. 362/493 |

FOREIGN PATENT DOCUMENTS

GB                2208134 A   *   1/1989  ............. F21V/3/04

\* cited by examiner

*Primary Examiner*—Stephen Husar
*Assistant Examiner*—Sharon Payne
(74) *Attorney, Agent, or Firm*—Alix, Yale & Ristas, LLP

(57) ABSTRACT

Brackets received in an elongated base support both lens portions and internal light bar components. Lens portion longitudinal edges penetrate the outer portion of a gasket channel to engage a gasket member. Lens retainer straps sandwich gasket layers to seal the longitudinal butt ends of lens portions. The lens retainers also penetrate the gasket channel to engage the gasket member. The brackets provide multiple locations for mounting warning light units and related light bar components within the space defined between the base and the lens portions.

15 Claims, 7 Drawing Sheets

LIGHT BAR WITH INTEGRATED WARNING ILLUMINATION AND LENS SUPPORT STRUCTURE

This application claims the benefit of Provisional Application No. 60/401,551, filed Aug. 7, 2002.

BACKGROUND OF THE INVENTION

1. Field of the Invention

The present invention relates to warning light systems in the form of a light bar intended primarily for installation on land and marine vehicles and particularly to a light bar assembly having an integrated warning light and lens support structure.

2. Description of the Related Art

Warning light assemblies in the form of light bars mounted on emergency vehicles are well known in the art. Such light bars typically comprise an elongated base to which warning lights and lenses are mounted. The light bar may also include power supplies and control circuitry to provide a self-contained light bar assembly. The light bar exterior typically includes multiple lenses that re-direct and/or color light from the warning light units mounted inside. A rigid base of metal or plastic provides mounting points for attaching the light bar to the emergency vehicle and for supporting the warning light units, lenses and other light bar components.

It is known to provide the base of a light bar in the form of an extrusion. A relatively complex, elongated base of high-strength can be produced efficiently by extrusion from aluminum, plastic, or the like. U.S. Pat. No. 4,620,268, assigned to the assignee of the present invention, is illustrative of a light bar utilizing an extruded support structure. It should be noted that in the '268 patent, lens portions are slidably received into outward-facing "locking grooves" defined by the extrusion. While such a lens/support structure relationship allows for efficient and flexible manufacture, the sliding lens and channel relationship is difficult to seal against penetration by water. Specifically, water penetrates the lens/channel joint by capillary action and under pressure from wind and water present in the emergency vehicle environment. Configuring the lens edges to be received more tightly in the locking grooves may cause the lens portions to bind during assembly.

Weather resistance, in particular resistance to penetration by water, is an important feature for a light bar intended for installation on land and marine emergency vehicles. Such vehicles are typically exposed to extremes of heat and cold as well as water in the form of ocean spray, rain, sleet, snow and ice. Penetration of water or moisture into a light bar can have adverse effects ranging from fogging the lenses to corroding metal parts to destruction of electronic components.

A light bar typically includes lens portions of different colors and alternative light-refracting characteristics. Assembling the light-transmissive cover of a light bar from discrete lens portions allows production of a light bar in which the pattern of warning light units and colors may be changed to suit customer requirements. Manufacture of a one-piece light-transmissive cover including clear and colored portions with different light refracting patterns is impractical. Further, discrete lens portions allow access to internal components for service of a light bar by permitting removal and/or replacement of lens portions as opposed to the entire light-transmissive cover of the light bar.

A light bar with a light-transmissive cover assembled from discrete lens portions complicates the problem of providing a weather-resistant enclosure. The '268 patent discloses gasket dividers compressed between longitudinal edges of the lens portions. Light bar end caps engage the extruded support structure to hold the lens portions and gaskets in a sealed relationship. The gasket material seals lens edges to dividers when the lens portions are compressed along the length of the light bar. While this approach improves weather resistance of the junction between lens portions, it fails to address weather resistance of the joint between the longitudinally received lens portions and an extruded base. The sliding relationship between the lens portions and the extruded base make inclusion of gasket or other sealing material in the joint problematic.

A further drawback to the light bar assembly typified by the '268 patent is that access to internal components in the middle of the light bar requires disassembly of all lens portions between one end of the light bar and the position of the component in need of service. Other manufacturers have taken the approach of breaking the light-emitting portion of a light bar into discrete units, each unit individually sealed to an elongated substructure. This approach lacks the flexibility of light bar fabrication provided by an elongated support structure with a light-transmissive cover that together define a substantially uninterrupted internal space. Such an internal space may be filled with a variety of power supplies, control circuits and warning light modules. As long as the components are arranged to fit within the space defined by the base and light-transmissive cover, the manufacturer is free to configure the light bar as required by a particular standard or customer specification.

There is a need in the art for a light bar with a light-transmissive cover in the form of a modular lens system where the connections between discrete lens portions and the junction of the light-transmissive cover with an elongated light bar base structure demonstrate improved weather resistance. Such a modular lens system will ideally enhance the efficiency of manufacture, assembly and service of the light bar.

SUMMARY OF THE INVENTION

A light bar in accordance with a first aspect of the present invention utilizes a channel-shaped aluminum extrusion as the base for a light bar. A primary channel of the base is defined between a rear wall and side walls projecting from the rear wall. The extrusion defines features on the back of the base rear wall that receive hardware for mounting the light bar to a vehicle. The base defines longitudinally extending slots opening into the primary channel that slidably receive brackets which support warning light assemblies and provide mounting points for lens portions that form the light transmissive cover of the light bar. Each side wall of the base defines a gasket channel facing away from the rear wall of the base.

In accordance with other aspects of the invention, the gasket channel has an outer portion that defines a forward opening of the gasket channel. The outer portion communicates with an inner portion of the gasket channel that receives a resilient gasket that substantially fills the inner portion. The gasket channel outer portion is defined between two longitudinally parallel walls that converge as they progress from the forward terminus of the side wall toward the gasket channel inner portion. The utility of these converging walls will be discussed in more detail below.

A further aspect of the invention provides brackets configured for sliding reception in the base. Each bracket has a foot with lateral protrusions configured for sliding reception in slots defined by the side walls of the base. A lens support arch extends from the foot to mounting points for fixing the lens portions to the base. The brackets include mounting locations for supporting a variety of warning light modules and related components beneath the lens portions.

The brackets integrate mounting of lens portions to the base with support of warning light assemblies inside the light bar. Received brackets are slidable longitudinally relative to the base but are constrained from movement toward or away from the rear wall of the base by engagement of the foot with the side walls of the base. Due to the longitudinal extent, e.g., width—measured along the length of the base, of the bracket foot, the brackets are substantially constrained from twisting relative to the base. In other words, the received bracket is maintained substantially perpendicular to the length of the base across the primary channel defined between the side walls of the base. Once fixed relative to the length of the base, as will be further discussed below, the brackets provide a rigid support structure for the lenses, warning light units and other internal components, such as reflectors.

In accordance with further aspects of the invention, the light-transmissive cover of the light bar is provided in the form of a plurality of discrete lens portions configured to fit over the lens support arch of a received bracket. When placed over a received bracket, rearwardly projecting longitudinal edges of each lens portion penetrate the gasket channel outer portion to sealingly engage a resilient gasket member in the gasket channel inner portion. A strap-like lens retainer is configured to span the gap between the butt ends of longitudinally adjacent lens portions and sandwich lens portion ends, together with gasket layers, against the lens support arch to provide a substantially weather-tight sealed connection between the lens portions. The lens retainer has an arch shape substantially identical to the lens outside surface, while the lens has an inside surface configured to match the shape of the lens support arch. When the lens retainer is assembled over the lens, gasket layers and lens support arch, these components form a layered or "sandwich" configuration in which pressure is exerted on the gaskets and lens toward the lens support arch by the lens retainer.

In accordance with a further aspect of the present invention, the lens retainer has side legs with a length sufficient to extend through the gasket channel outer portion and contact the resilient gasket material in the gasket channel inner portion. The converging walls of the gasket channel outer portion direct the lens portion longitudinal edges and ends of the lens retainer legs toward each other as they pass through the gasket channel outer portion. This relationship compresses gasket material between the lens retainer and the lens portion butt ends to provide a sealed relationship between the lens retainer and lens portion butt ends.

Penetration of the lens portion longitudinal edges and lens retainer ends into the gasket channel brings them to bear against the resilient gasket material contained in the gasket channel inner portion. This serves to compress the flexible gasket material to provide a substantially water-tight seal between the base and the lens portion longitudinal edges. The resilient gasket material is displaced outwardly against the sides of the gasket channel while the lens portion longitudinal edges press into the gasket material to provide a sealed relationship along the length of the lens portions. The lens portions are substantially rigid along their length due to the deep, three-dimensional configuration. This rigidity ensures that inward force at either end of a lens portion is distributed evenly along the longitudinal edges where they contact the gasket material.

In accordance with a further aspect of the present invention, the outward facing surface of each lens support arch defines fastener receptacles. Fasteners pass through each lens retainer and between the butt ends of longitudinally adjacent lens portions to engage the lens support arch. Engagement of these fasteners with the lens support arch develops a force relationship between the bracket, base, lens and lens retainer wherein force is developed toward the base by the ends of the lens retainer and the lens portion longitudinal edges. This inward force is translated into an outward force on the bracket foot received in the base. Since the bracket is constrained from movement away from the base, the lens portions and base are retained in fixed relationship to each other, connected by the bracket. The bracket is in tension between the base and the lens portions. The dimensions of the lens portions, lens retainer and brackets in combination with the resilient characteristics of the gasket material advantageously limit the maximum forces developed among the assembled parts.

In accordance with a further aspect of the present invention, each bracket is provided with features for supporting warning lights and associated hardware in the interior of the light bar, e.g., beneath the assembled lens portions. Clip retention slots are defined in laterally opposite portions of the lens support arch near the bracket foot. The slots receive lateral protrusions of a clip that releasably supports the ends of adjacent warning light reflectors. The slots originate from opposite sides of the bracket such that the clip is received by rotation or twisting in place. This slot configuration permits simple installation of the clip while retaining the clip in a fixed longitudinal position relative to the bracket in response to pressure from either side of the clip. The bracket also includes fastener receptacles beneath the lens support arch to which, for example, reflector portions or load light support brackets may be secured.

In accordance with a further aspect of the present invention, the longitudinal ends of the light bar are defined by a molded end piece that engages the longitudinal ends of the base. Each end portion tapers from the height of the base side wall to a shorter end wall and extends the gasket channel around the end of the light bar such that the gasket member extends continuously around the periphery of the light bar. Lens end portions are configured to match the tapered configuration of the end piece and the shape of the gasket channel of the end piece. The tapered shape of the end piece provides enhanced lateral visibility for warning lights mounted adjacent the ends of the light bar. Fasteners pass though the lens end portions to engage the end piece to compress the lens end portion rearward facing edge against the gasket member extending around the end piece.

In accordance with a further aspect of the present invention, an exterior surface of a side wall of the base (corresponding to the upper surface of the mounted light bar) may be provided with longitudinal ribs defining a location for a row of upward projecting lights. These lights, known in the industry as ICC lights, are required along the highest point of commercial and emergency vehicles.

An object of the present invention is to provide a new and improved light bar for an emergency vehicle having improved weather resistance.

Another object of the present invention is to provide a new and improved light bar configuration having improved flexibility and efficiency of manufacture.

A further object of the present invention is to provide a new and improved light bar light bar for emergency vehicles having improved ease of maintenance.

A yet further object of the present invention is to provide a new and improved light bar for emergency vehicles wherein the useful life of the light bar may be extended by replacement of wear and sealing elements.

BRIEF DESCRIPTION OF THE DRAWINGS

These and other objects, features and advantages of the present invention will become readily apparent to those skilled in the art, upon reading the description of the preferred embodiments, in conjunction with the accompanying drawings, in which:

FIG. 4A is an enlarged portion of FIG. 4 illustrating the gasket channel, gasket member, lens longitudinal edge and lens retainer end in their assembled relationsips;

DETAILED DESCRIPTION OF THE PREFERRED EMBODIMENTS

Exemplary light bars illustrating various aspects of the present invention will now be described with reference to FIGS. 1–8. The illustrated exemplary light bars 100 are configured for mounting on the forward (leading) or rear (trailing) upper edges of the utility body (not shown) on a vehicle such as an ambulance or fire truck. While various aspects of the invention will be described in the context of this exemplary light bar configuration, many aspects of the present invention are generally applicable to light bars, emergency signaling lights, traffic directors and other related assemblies.

Figure 1:
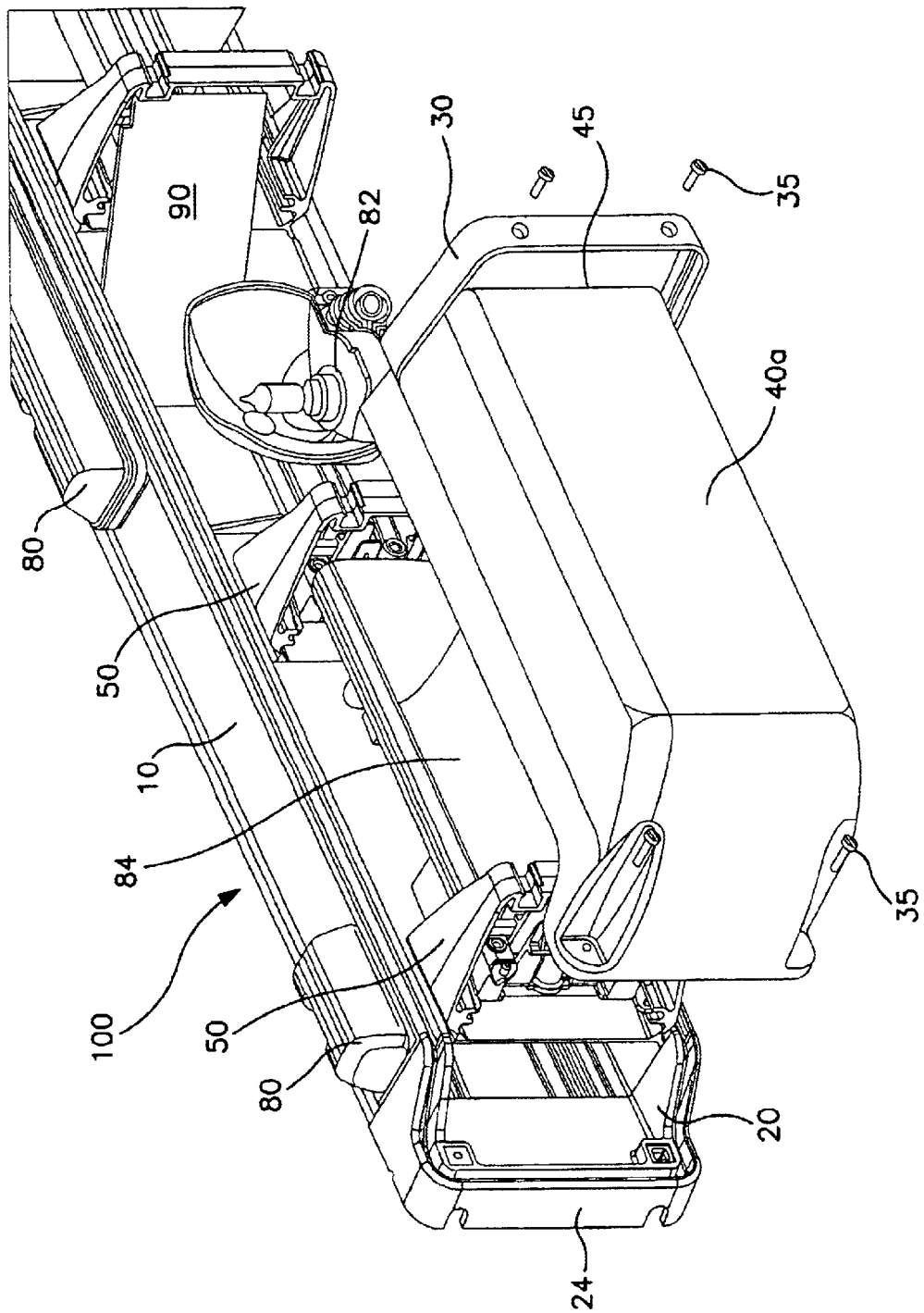
FIG. 1 is a partial left-end, partially exploded perspective view of a light bar exemplary of several aspects of the present invention.
Figure 2:
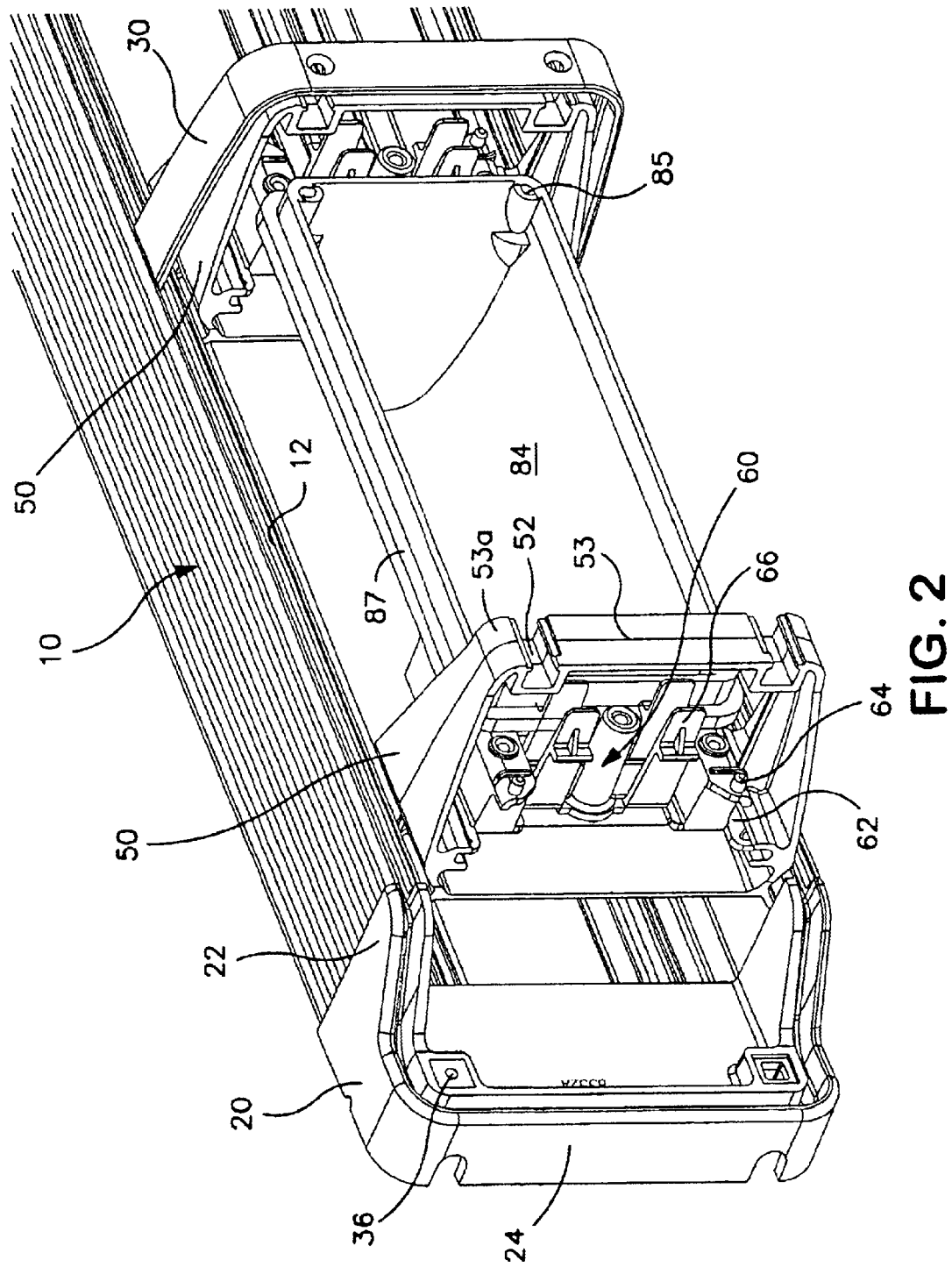
FIG. 2 is a partial left-end view of a light bar exemplary of several aspects of the present invention with the lens end portion and lens retainer omitted for clarity.
Figure 6:
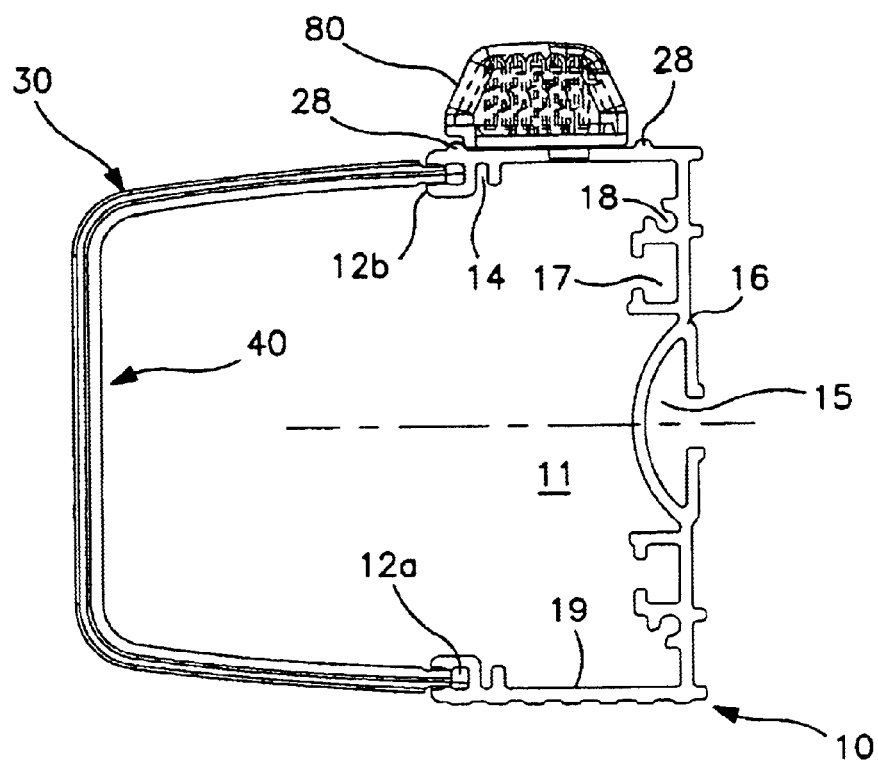
FIG. 6 is a sectional view through a warning light base, lens and lens retainer showing an ICC light mounted to the top surface of the base in accordance with an aspect of the present invention.
Figure 7:
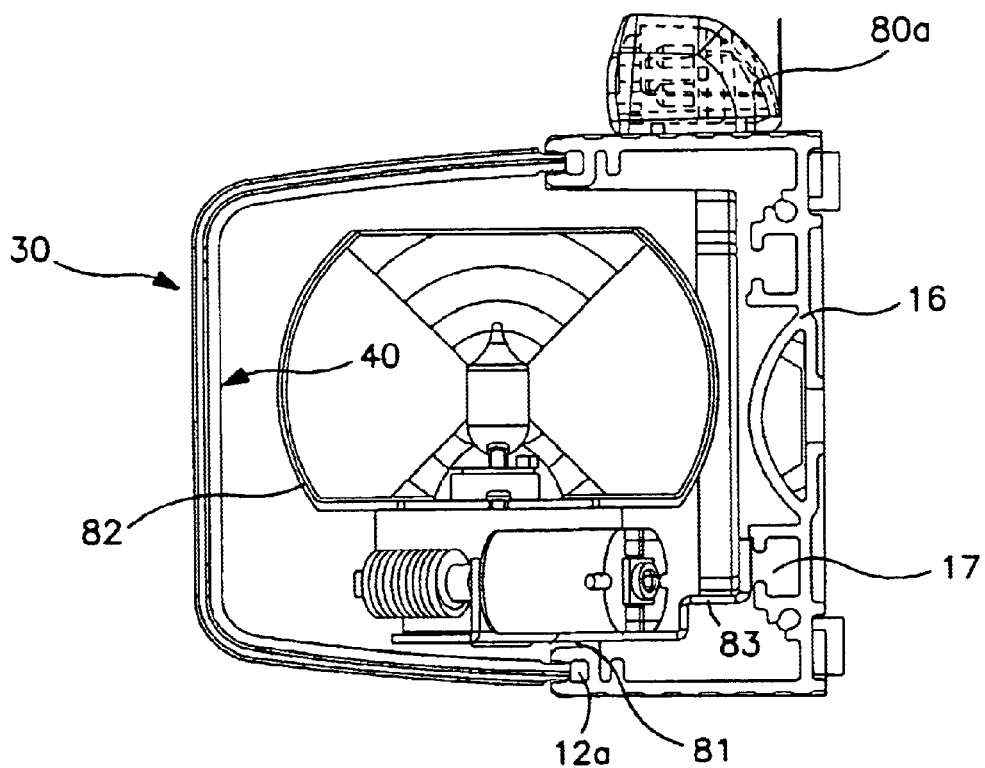
FIG. 7 is a sectional view through a warning light base, lens and lens retainer illustrating a rotating warning light mounted to the base and an alternative ICC light mounted to an upper surface of the light bar base in accordance with further aspects of the present invention.
Figure 8:
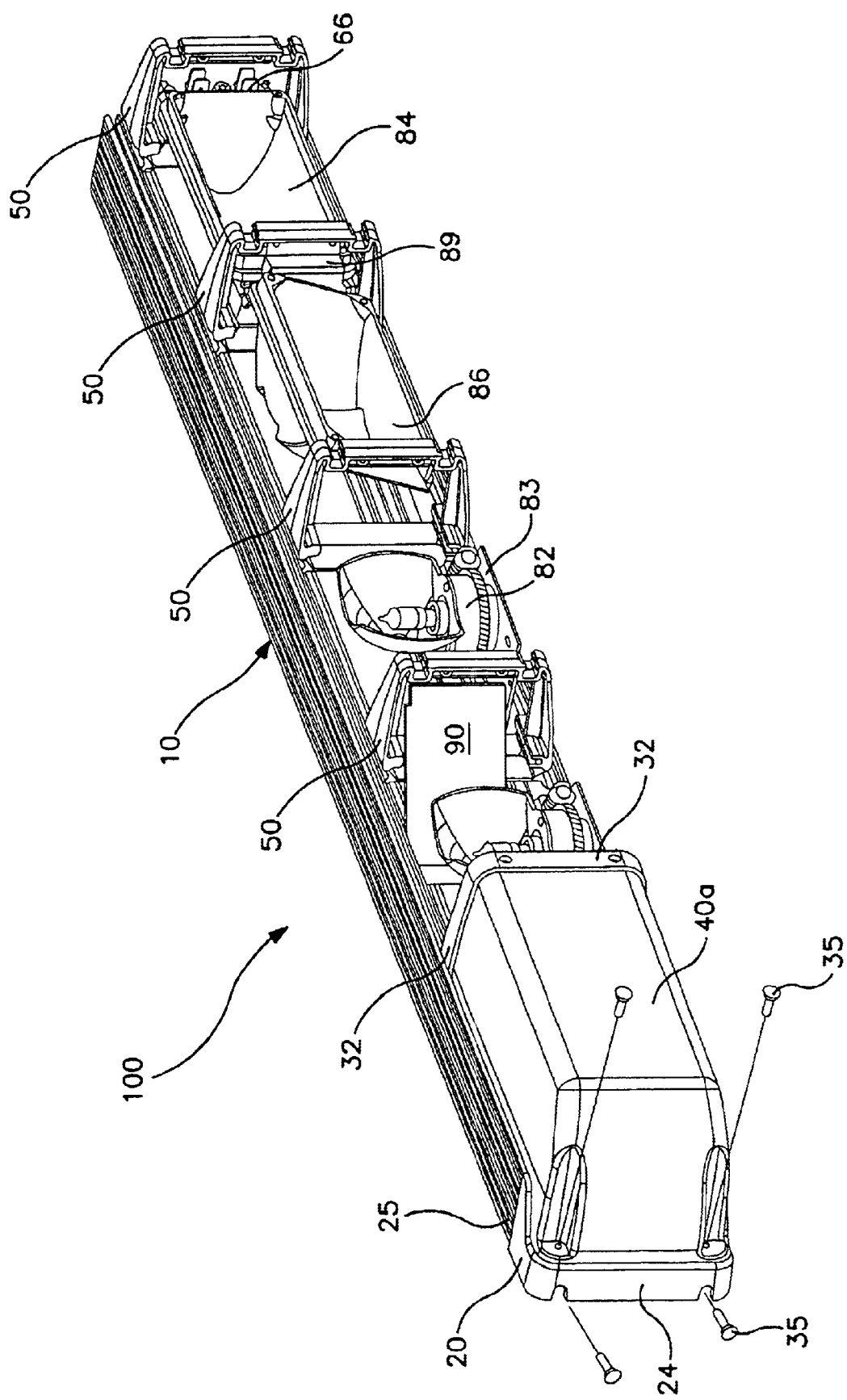
FIG. 8 is a partial left-end perspective view of an exemplary light bar including two rotating warning lights, a load light, left lens end portion and lens retainer in accordance with further aspects of the present invention.

FIGS. 1, 2 and 8 are left-end perspective views of exemplary alternative embodiments of a light bar 100 illustrating various aspects of the present invention. The components of a light bar 100 are mounted to a rigid base 10 of extruded aluminum. The configuration of the extruded base 10 is best shown in FIGS. 4–7. The base 10 has a generally uniform sectional configuration along its length. The base 10 defines a primary channel 11 between side walls 19 projecting from a rear wall 16. The rear wall 16 defines a longitudinally extending, rearward facing channel 15 configured to receive the heads of mounting bolts (not illustrated) that secure the light bar 100 to an emergency vehicle or other structure (not shown).

The base rear wall 16 further defines two parallel channels 17 communicating with the primary channel 11 of the base. These parallel channels 17 are configured to receive Fastex® grommets 36 to serve as mounting points for various warning light, reflector, power supply, control circuitry or other assemblies to be secured within the light bar. The rear wall 16 further defines longitudinal features that in section provide two laterally spaced fastener receptacles 18 by which light bar end pieces 20 (further described below) are secured to opposite longitudinal ends of the base 10.

Figure 4:
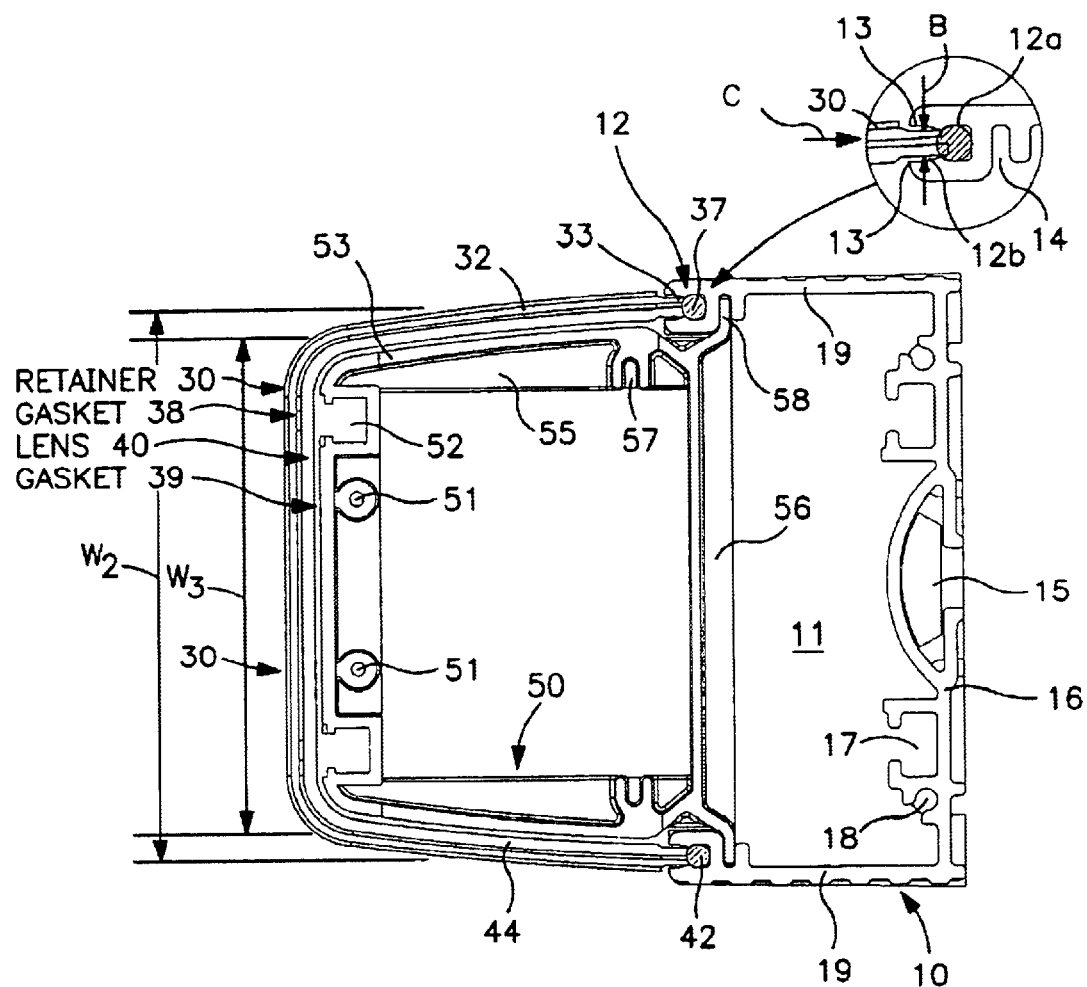
FIG. 4 is a sectional view through a light bar base, received bracket and attached lens assembly in accordance with several aspects of the present invention.
Figure 5:
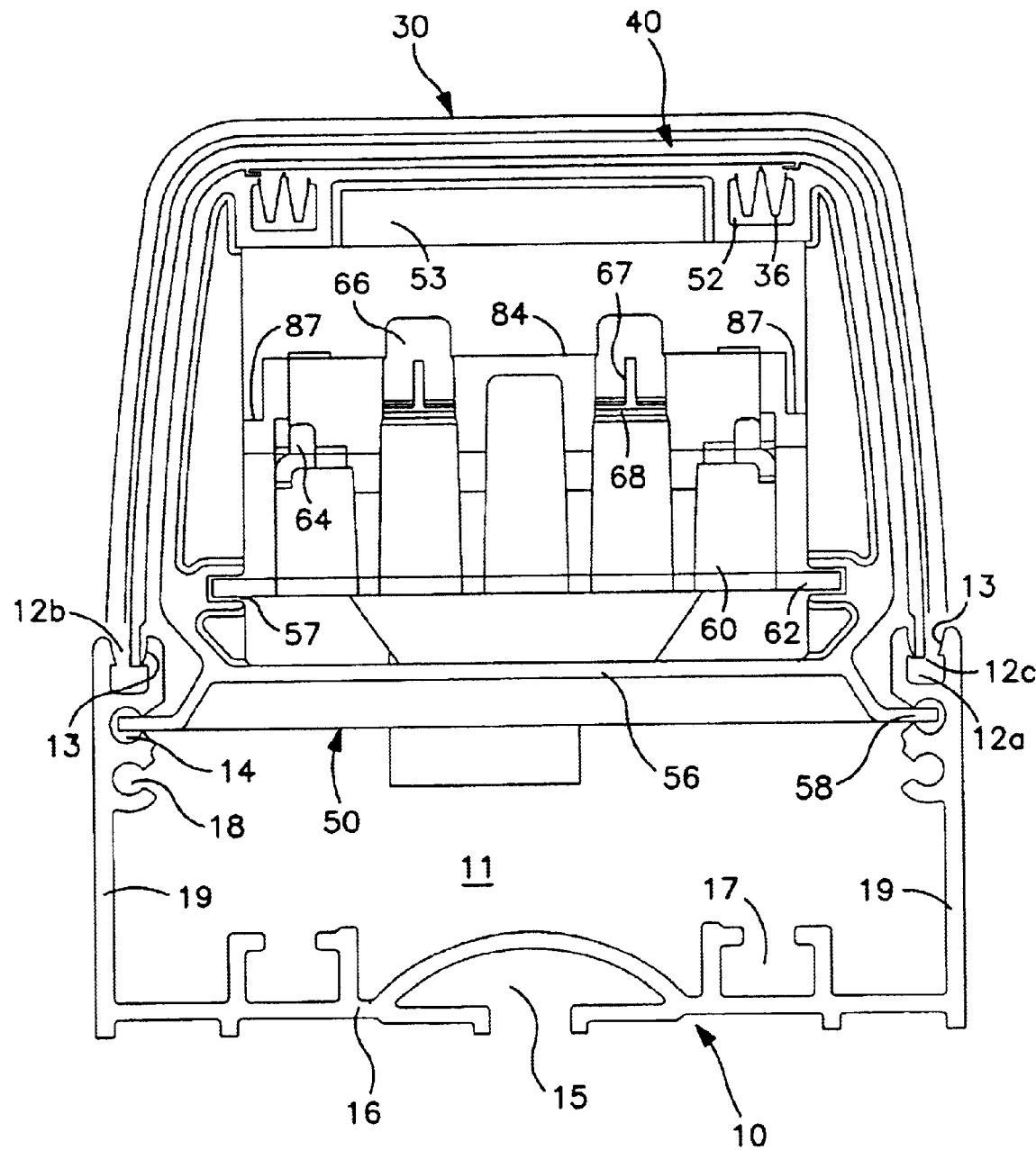
FIG. 5 is an enlarged sectional view through a light bar base, received bracket and attached lens, gasket, lens retainer assembly and a reflector support clip in turn supporting an exemplary warning light reflector.

The generally parallel side walls 19 project substantially perpendicularly from the rear wall 16 of the base. The forward end of each side wall 19 defines a gasket channel 12 having inner 12a and outer 12b portions (as best seen in FIGS. 4A and 5). The illustrated gasket channel inner portion 12a is generally rectangular, although other configurations are possible. The gasket channel outer portion 12b defines a longitudinal opening 12c communicating with the gasket channel inner portion 12a. The gasket channel outer portion 12b is defined between longitudinally parallel walls 13 that converge as they proceed from the forward terminus of the side wall 19 toward the gasket channel inner portion 12a. These converging walls 13 result in a compressive force between mounted lens assembly components 30, 40 as will be further described below. Further, the converging walls 13 narrow the entrance 12c to the gasket channel inner portion 12a. A gasket member 37, which is configured to substantially fill the gasket channel inner portion 12a, is trapped within the gasket channel inner portion by the parallel bottom corners of the converging walls 13.

Each side wall 19 further defines a longitudinal slot 14 opening into the base primary channel 11 generally perpendicular to the side wall 19. As best seen in FIGS. 4, 4A and 5, these longitudinal slots 14 are configured to receive lateral projections 58 from the foot 56 of a lens support bracket 50.

The several longitudinally extending features of the base 10 are efficiently produced by extrusion. While the illustrated base extrusions are of aluminum, extrusions of other materials and elongated base structures produced by means other than extrusion may occur to one of skill in the art without departing from the spirit and the scope of the present invention.

A light bar 100 in accordance with a further aspect of the present invention includes a plurality of lens support brackets 50 as shown in FIGS. 2–5. Each lens support bracket 50 comprises a foot 56 having laterally extending projections 58 configured to be received in the slots 14 defined by the side walls 19 of the base. The illustrated lens support brackets 50 are molded from plastic and include webs 55 that lend rigidity to the part. A lens support arch 53 projects from the foot 56 of the bracket. This arch 53 is of a rounded rectangular configuration with the sides of the arch converging as the arch 53 projects away from the foot 56 of the bracket. The top of the lens support arch 53 is generally flat between rounded forward corners 53a. Inwardly of the forward corners 53a, the lens support arch 53 includes features 52 configured to receive Fastex® grommets 36. Fastex® grommets 36 expand when penetrated by a fastener 35. This expansion traps the grommet 36 in place, anchoring the fastener 35 and the grommet to the lens support arch 53. If the Fastex® grommet 36 becomes damaged or an alternative fastener is desired, the old grommet is removed and replaced with an appropriate new grommet. The grommet receiving features 52 of the lens support arch 53 permit some movement of the grommet 36 relative to the bracket 50. This relative movement simplifies component alignment during assembly of a light bar in accordance with an aspect of the present invention.

Figure 3:
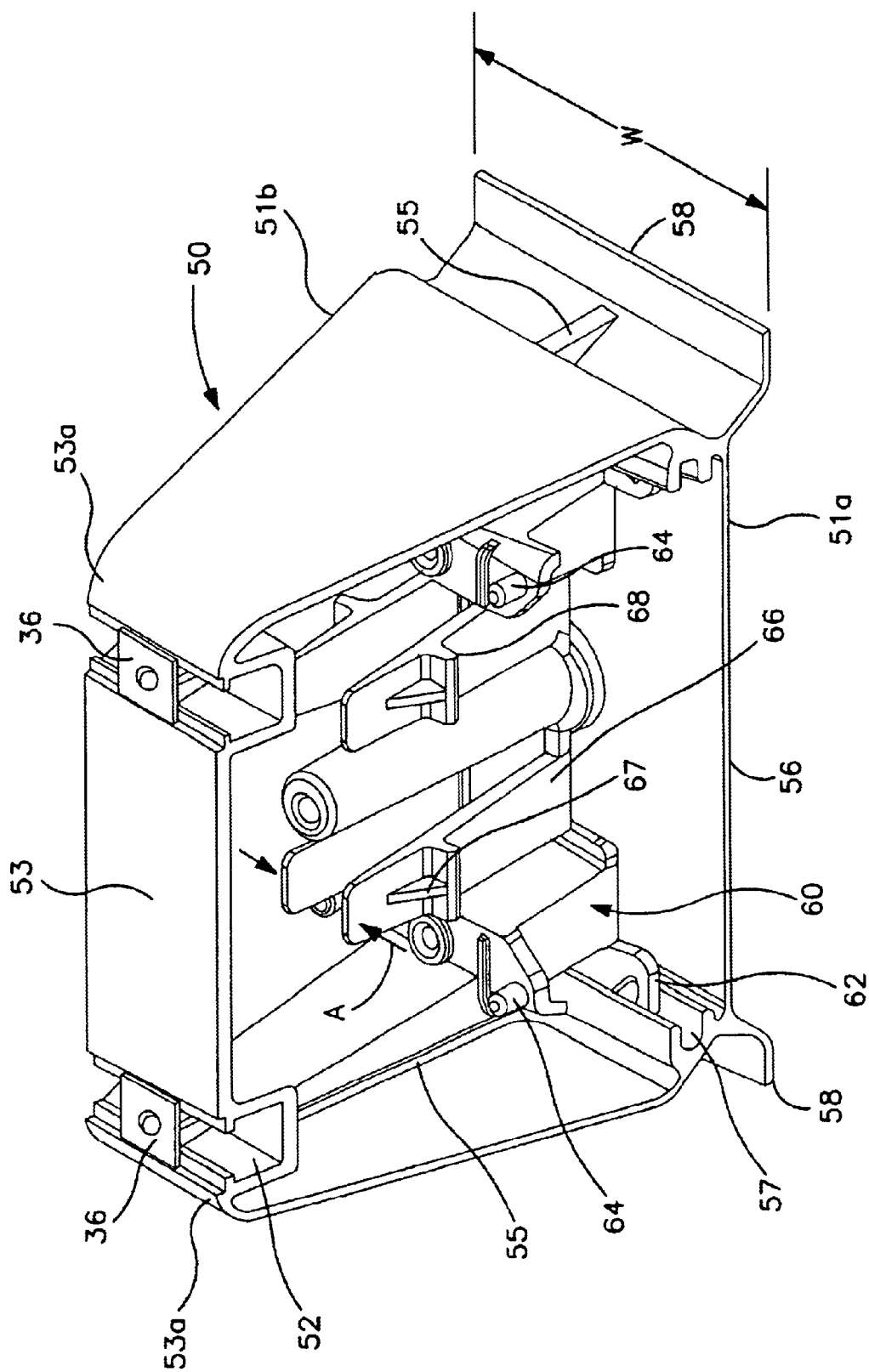
FIG. 3 is a perspective view of a bracket and received reflector support clip embodying several aspects of the present invention and suitable for use in conjunction with a light bar in accordance with the present invention.

With reference to FIG. 3, it should be noted that the lens support bracket 50 has an extended width W at its foot 56 (the width W measured in a direction corresponding to the longitudinal dimension of the base 10). Width W is preferably at least 25% of the lateral width of the base 10. This width W enhances the structural rigidity of the bracket 50 and also restrains the bracket 50 from twisting relative to the base 10. Thus, a received bracket 50 is retained across the base 10 generally perpendicular to the longitudinal dimension of the base 10.

A further feature of the lens support brackets are inward-facing clip-retention slots 57 adjacent the foot 56 of the bracket. Laterally opposed clip-retention slots 62 communicate with opposite end faces 51a, 51b of the bracket 50 as shown in FIGS. 3 and 4 (the end faces 51a, 51b of the bracket correspond to the longitudinal ends of the base 10). To install a reflector support clip 60 to a bracket 50, the clip 60 is positioned inside the bracket 50 with diagonally opposed portions of the clip lateral projections 62 at the longitudinally opposite entrances of the clip retention slots 57. The clip 60 is then rotated relative to the bracket 50 to fully engage the lateral projections 62 into the clip retention slots 57. The clip retention slot 57 configuration promotes ease of assembly while retaining received clips 60 against longitudinal forces exerted from either side of the bracket 50.

The reflector support clips 60 are configured to releasably retain longitudinal ends of adjacent warning light reflectors 84. Each face of the clip 60 includes two posts 64 and two flexible latch fingers 66 for this purpose. The configuration of a representative warning light reflector 84 is best seen in FIGS. 1, 2 and 5. The periphery of the illustrated reflector 84 takes the form of a rounded rectangle and includes bores 85 inwardly spaced from each of the reflector corners. These bores 85 may receive fasteners 35 from the front to mount a lens to the reflector 84. The posts 64 are arranged to enter the bores 85 from behind the reflector 84 as the reflector 84 is inserted toward the base 10 of the light bar 100. A rim or flange 87 projects laterally around the periphery of the reflector 84. The latch fingers 66 are configured with ramps 67 so that a reflector 84 displaces the latch fingers 66 in direction A as the reflector 84 is inserted toward the base 10. When the flange 87 has passed the end of the ramp 67, the fingers 66 resiliently return to a position where a latch projection 68 fits over the flange 67 to retain the reflector to the clip 60. To remove the reflector 84, the latch fingers 66 are pushed away from the flange 87 and the reflector 84 is free to be retrieved away from the clip 60 and bracket 50.

The reflector support clip 60 shown in FIGS. 2 and 5 retains a warning light reflector 84 substantially parallel to the base rear wall 16. This orientation is appropriate for producing a lateral spread or a horizontal band of warning light as is desirable for most warning or signaling applications. However, light units for other purposes, such as load lights in a light bar mounted to the rear of an ambulance or fire truck, require an alternative mounting orientation. FIG. 8 illustrates a load light 86 having an angled orientation relative to the base 10 and the warning light reflectors 84. The load light 86 is angled to project light downward in the area behind the vehicle to illuminate the loading or unloading of personnel or equipment. Load light brackets 89 mount to the lens support bracket 50 to hold the load light 86 at the desired orientation.

The illustrated lens support arch 53 includes two fastener receptacles 51 to which load light brackets 89, such as those illustrated in FIG. 8, may be attached. A reflector support clip 60 is not installed between the load light and rotating beacon in FIG. 8. In accordance with an aspect of the present invention, only components necessary to the selected light bar configuration need be installed. The fastener receptacles 51 of the lens support arch 53 may also mount reflectors 90 such as those shown in FIGS. 1 and 8. These reflectors 90 improve light output from rotating warning lights 82 by reflecting light that would otherwise be lost inside the light bar.

With reference to FIGS. 1, 7 and 8, a light bar in accordance with a further aspect of the present invention easily accommodates a rotating warning light 82 in the space defined between the lens portions 40 and the base 10. As best seen in FIG. 7, the base plate 83 of the rotating warning light 82 is mounted to the rear wall by means of Fastex® grommets 36 received in the longitudinal grommet channel 17 defined on the rear wall 16. Foam tape 81 may be used to further support the rotating warning light 82 where the base plate 83 passes over the side wall 19.

An exemplary lens retention system in accordance with a further aspect of the present invention is best illustrated in FIGS. 4 and 5. Lens portions 40 are configured to fit over the lens support arch 53 of the lens support bracket 50. When so installed, a longitudinal edge 42 of the lens portion 40 penetrates the gasket channel outer portion 12b to engage the resilient gasket member 37 installed in the gasket channel inner portion 12a. Each lens portion 40 (other than lens end portions 40a) have a length (measured parallel to the length of the base) sufficient to extend between at least two lens support brackets 50. The lens portions have a lateral width $W_2$ which is greater at the longitudinal edge 42 than the width $W_1$ at the rounded forward corners. The lens side walls 44 are preferably slightly arched for additional rigidity. The deep three-dimensional sectional shape of the lens portions 40, 40a provides very good longitudinal rigidity. The butt end 45 of a lens portion 40, 40a is provided with a strip of gasket material 38 applied to its outside surface. Gasket material 39 is also provided over the lens support arch 53.

A strap-like lens retainer 30 spans the gap between longitudinally adjacent lens portions 40, 40a and covers the gasket strips 38 at the butt ends 45 of the lens portions 40, 40a. Fasteners 35 pass through the lens retainer 30 and the gap between lens portions 40, 40a to engage Fastex® grommets 36 retained in the lens support arch 53. Legs 32 of the retainer 30 extend along the side walls 44 of the lens portion 40, 40a to penetrate the gasket channel outer portion 12b and engage the gasket member 37 in the gasket channel inner portion 12a. FIGS. 4 and 5 illustrate the sandwich configuration of an assembled lens support bracket 50, lens 40, 40a and retainer 30. Gasket material is compressed between the lens support arch 53 and the inside surface of the lens 40, 40a and between the outside surface of the lens 40, 40a and the inside surface of the lens retainer 30.

The lens retainer 30a preferably has stiffness sufficient to spread compressive force from the fasteners 35 along the length of the retainer 30/gasket 38 interface. As best seen in FIG. 4A, the converging walls 13 of the gasket channel outer portion 12b force the end of the lens retainer 30 toward the outer surface of the lens 40 at the longitudinal edge 42 (along line B). In the assembled light bar 100, the retainer 30, gasket strip 38, lens 40, 40a and inside gasket 39 are pushed together at four points, e.g., the two fasteners 35 and adjacent the longitudinal edges 42/lens retainer ends 33 as shown in FIG. 4A. The lens retainer 30 spreads these compressive forces along the length of the joint, providing a sealed, sandwich relationship among the parts of the lens retainer assembly.

The forces developed on the lens portions 40, 40a and the retainer 30 in the illustrated lens assembly are limited by the length of the lens side walls 44 and the length of the lens retainer legs 32 in combination with the properties of the gasket material in the gasket channel inner portion 12a. By adjusting these variables, greater or lesser force levels can be achieved.

In accordance with a further aspect of the present invention, longitudinal ends 25 of the base 10 are capped by a molded end piece 20. The molded end piece 20 tapers from the height of the base side wall 19 to an end wall 24 having a reduced height. Lens end portions 40a, such as those illustrated in FIGS. 1 and 8, track this tapered configuration to provide increased wide-angle visibility for warning lights installed adjacent the ends of the light bar. The end pieces 20 extend the gasket channel 12 around the end of the light bar 100. The resulting continuous gasket channel 12 permits use of a strip or cord of gasket material 37 configured to extend the entire length of the gasket channel 12. The ends of the cord or strip may be bonded to form a continuous gasket.

Fastex® grommets 36 at the corners of the end piece 20 receive fasteners 35 passing through corners of the lens end portion 40a. The fasteners 35 secure the lens end portion 40a against the gasket member 37. As shown in FIG. 8, fasteners also extend longitudinally through the end piece 20 into fastener receptacles 18 in the base 10 to secure the end piece 20 longitudinally against the base 10. FIG. 4 illustrates fastener receptacles 18 in the base 10 appropriate for the configuration illustrated in FIG. 8. An alternative fastener receptacle 18 location is illustrated in FIG. 5.

A light bar 100 comprising a base 10, lens support brackets 50, reflector support clips 60, lens portions 40, 40a, lens retainers 30, gasket member 37 and gasket layers 38, 39 provide a weather-tight light bar enclosure. The lens support brackets 50, light units 82, 86, 84, reflectors 90 and other internal components can be selected and arranged to provide a variety of light bar configurations.

In accordance with a further aspect of the present invention, longitudinal ribs 28 are formed on the outside surface of one of the side walls 19 of the base 10. These longitudinally extending ribs 28 serve to locate one or more ICC lights 80 along the top surface of the light bar 100. Ordinarily, ICC lights 80 would be mounted to the top surface of the utility body (not illustrated) of the emergency vehicle, requiring modifications to the utility body to mount and wire these lights. ICC lights 80 mounted to the upper surface of the light bar 100 as shown in FIGS. 1, 6 and 7 do not require modification of the utility body beyond that required to mount the light bar 100. The ICC lights may be fixed to the top surface of the base 10 using double-sided adhesive material similar to that used to mount automotive side body moldings. These adhesive materials are substantially weather proof, long lasting and require no fasteners. The longitudinal ribs provide location aids and lateral support for the ICC lights. The upper surface of the light bar base is provided with holes for routing electrical power to the ICC lights. Since the light bar is mounted adjacent the upper corner of the utility body of the emergency vehicle, the ICC lights are mounted to the highest point of the vehicle as required by law.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A light bar enclosure comprising:

a longitudinally extending base defining a channel bounded by a rear wall and substantially parallel side walls projecting from the rear wall, each side wall having inside and outside surfaces and a forward terminus spaced from said rear wall, each said forward terminus defining a longitudinally extending groove and each said inside surface defining at least one longitudinally extending slot;

at least one bracket slidably receivable in said base, said bracket comprising:

a foot configured to be longitudinally slidably engageable with and receivable between said slots whereby the bracket, when received in the base, is constrained from movement toward or away from the rear wall of the base; and a lens support arch extending from said foot away from the rear wall of the base when the bracket is received in the base;

at least one lens portion having a pair of substantially parallel longitudinally extending edges and configured to fit over the lens support arch of the bracket, with the edges penetrating into laterally opposed portions of the groove defined at the terminus of each side wall when the bracket is received in the base;

at least one lens retainer configured to fit over and generally parallel with said lens portion, said retainer extending between a pair of laterally opposed ends and configured such that when said lens retainer is placed over the at least one lens portion and the bracket when the bracket is received in the base, said laterally opposed ends penetrate the groove defined at the terminus of each side wall;

a gasket for establishing a water resistant seal between the bracket, at least one lens portion and lens retainer; and fasteners for removably securing the lens retainer to the bracket, whereby the at least one lens portion is engaged between the bracket and the lens retainer with said gasket comprising a layer between the bracket and lens and/or lens and lens retainer.

2. The light bar enclosure of claim 1, wherein said groove includes an inner portion and an outer portion, said outer portion comprising an elongated opening to the inner portion defined between longitudinally parallel surfaces that converge as said surfaces approach said inner portion.

3. The light bar enclosure of claim 2, comprising a second gasket arranged in said inner portion, wherein said lens portion edges and said lens retainer ends penetrate through said outer portion to sealingly engage said second gasket.

4. The light bar enclosure of claim 1, comprising an end piece configured to enclose a longitudinal end of said base, side walls of the end piece tapering from a height of the base side walls to an end wall of reduced height, said end piece defining an end groove which extends along the periphery of said end piece to connect the grooves defined at the terminus of the base side walls.

5. The light bar enclosure of claim 1, comprising a plurality of lens portions, each lens portion having a length and opposed butt ends, a plurality of brackets and a plurality of lens retainers, wherein the butt ends of two said lens portions are covered by one said lens retainer and said fasteners extend through said lens retainer and between said butt ends to engage said lens support arch.

6. The light bar enclosure of claim 1, wherein said lens portion edges and lens retainer ends are forced into said groove by said fasteners' engagement with the lens support arch.

7. The light bar enclosure of claim 1, wherein said lens portions and said lens retainers resist inward movement of said fasteners and tightening said fasteners places an outward tension on said bracket and a corresponding inward force on said lens portion edges and said lens retainer ends.

8. A light bar comprising:
  an elongated base having a length an including longitudinally extending side walls extending generally perpendicular to a rear wall;
  at least one bracket slidably receivable between the side walls, a received bracket being constrained from movement toward or away from said rear wall and extending between said side walls substantially perpendicular to a length of said base;
  at least one lens portion configured to fit over said at least one bracket, said lens portion comprising a butt end and longitudinal edges;
  at least one lens retainer configured to fit over the butt end of the at least one lens portion, said lens retainer comprising a stiff strap extending between retainer ends and defining fastener openings; and
  fasteners configured to pass through said fastener openings to engage the at least one bracket,
  wherein the bracket is received between the side walls, the lens butt end is placed over the bracket, the lens retainer is placed over the lens butt end and the fasteners pass through the fastener openings to engage the at least one bracket, whereby the at least one lens portion longitudinal edges and the retainer ends bear against the side walls to produce an outward force on said bracket.

9. The light bar of claim 8, wherein said side walls extend from the rear wall to a terminus defining a longitudinal groove into which the lens portion edges and retainer ends penetrate to bear against the side walls.

10. The light bar of claim 8, wherein said side walls extend from the rear wall to a terminus defining a longitudinal groove, into which the lens portion edges and retainer ends penetrate to bear against the side walls, said light bar comprising a resilient gasket arranged in said longitudinal groove and sealingly compressed by said lens portion edges and retainer ends.

11. The light bar of claim 8, comprising a plurality of lens portions, a plurality of brackets; and
  at least one light emitter supported between longitudinally adjacent of said brackets within a space defined between said rear wall and said lens portions.

12. The light bar of claim 8, wherein said bracket comprises:
  a foot configured to be longitudinally slidably engageable with and receivable between a pair of opposed slots defined by said base side walls whereby the bracket, when received in the base, is constrained from movement toward or away from the rear wall of the base; and
  a lens support arch extending from said foot away from the rear wall of the base when the bracket is received in the base.

13. The light bar of claim 12, wherein said lens support arch defines partially enclosed slots for slidably receiving fastener engaging nuts, said slots permitting said nuts to move relative to the lens support arch during assembly of the light bar.

14. A light bar comprising:
  an elongated base having a rear wall and side wall projecting generally perpendicular to the rear wall to define a longitudinal channel;
  a plurality of brackets receivable in said channel and provided with laterally projecting feet that engage said side walls to constrain a received bracket from movement toward or away from said rear wall, the brackets comprising an arch projecting away from said rear wall beyond said side walls when said brackets are received in said channel;
  a plurality of lens portions secured to said base by engagement with said arch; and
  a plurality of light emitters secured between longitudinally adjacent brackets in a space defined between said rear wall and said lens portions.

15. The light bar of claim 14, comprising a lens retainer configured to span a gap between a butt end of two longitudinally adjacent lens portions, said lens retainer defining fastener openings; and
  a plurality of fasteners with shanks and heads,
  wherein said fasteners pass through said lens retainers to engage said bracket arch and tightening said fasteners secures said lens retainer and said lens portions to said arch.

* * * * *